United States Patent [19]

Fouquet

[11] Patent Number: 4,542,990
[45] Date of Patent: Sep. 24, 1985

[54] HYDRAULIC APPARATUS FOR DRIVING ONE OR MORE HYDRAULIC EQUIPMENT DEVICES, MOUNTED ON A SEMI-TRAILER, BY MEANS OF THE SYSTEM MOTORIZING THE SEMI-TRAILER

[76] Inventor: Jean-Claude Fouquet, 4 Rue des Alouettes, 91 540 Mennecy, France

[21] Appl. No.: 515,892

[22] Filed: Jul. 21, 1983

[30] Foreign Application Priority Data

Jul. 28, 1982 [FR] France ................................ 82 13165

[51] Int. Cl.$^4$ ........................... B28C 5/20; B28C 5/42
[52] U.S. Cl. ..................................... 366/61; 180/14.3; 180/14.2
[58] Field of Search ....................... 366/60, 61, 54, 55, 366/44; 180/14.3, 14.2, 53.4, 53.8, 307, 308

[56] References Cited

U.S. PATENT DOCUMENTS

| | | | |
|---|---|---|---|
| 2,968,915 | 1/1961 | Feistel | 366/54 |
| 3,612,202 | 10/1971 | Moon | 180/14.3 |
| 3,773,304 | 11/1973 | Hodgson | 366/61 |
| 3,994,353 | 11/1976 | Greene | 180/14.3 |

Primary Examiner—Robert W. Jenkins
Attorney, Agent, or Firm—Wenderoth, Lind & Ponack

[57] ABSTRACT

A hydraulic apparatus drives a semi-trailer hitched to a road tractor and a hydraulic equipment device carried by the semi-trailer. The apparatus includes an auxiliary motor capable of driving the device, for example a concrete mixer, through a hydraulic circuit when the vehicle is traveling along the ground, and an electric circuit for controlling valves which, when the vehicle is stationary, put in communication the circuit and a hydrostatic circuit which drives the concrete mixer. The hydrostatic circuit motorizing the semi-trailer is used for alternately driving either the axles of the semi-trailer or the equipment device to be driven.

4 Claims, 7 Drawing Figures

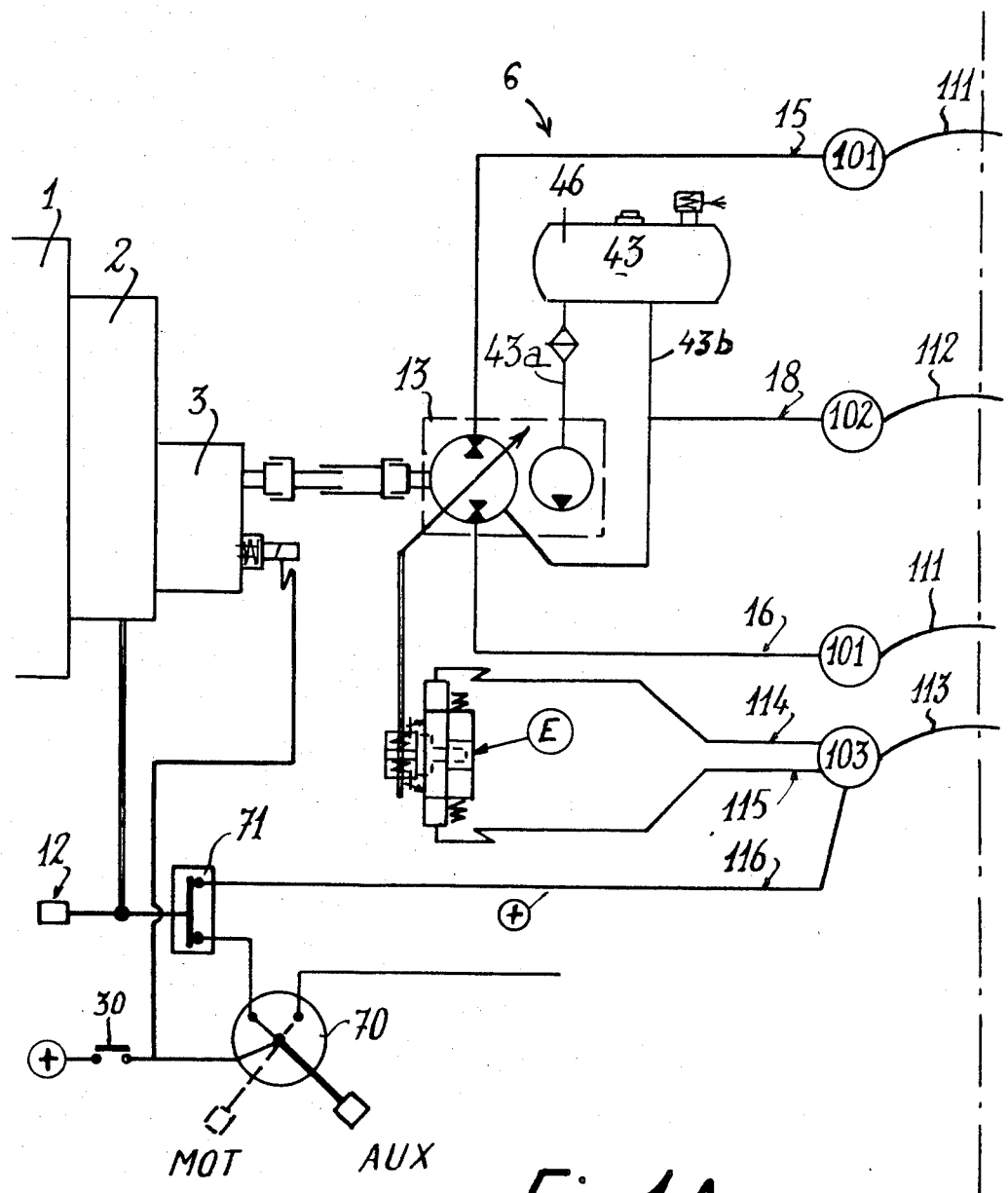
Fig: 1A

HYDRAULIC APPARATUS FOR DRIVING ONE OR MORE HYDRAULIC EQUIPMENT DEVICES, MOUNTED ON A SEMI-TRAILER, BY MEANS OF THE SYSTEM MOTORIZING THE SEMI-TRAILER

BACKGROUND OF THE INVENTION

The present invention relates to hydraulic apparatus for driving an element such as a concrete-mixer by means of a semi-trailer motorizing system, alternately with the semi-trailer, which is coupled to a tractor for travel along the road and on-site work and which supports the concrete-mixer.

In addition, the invention also relates to hydraulic apparatus for driving an element constituted by a supplementary hydraulic circuit and adapted for controlling for example hydraulic rams, boring tools, winches or like apparatus, by means of a hydrostatic motorizing system employed when the vehicule is travelling and pulling the semi-trailer.

Some systems for motorizing the axles of semi-trailers comprise, on the semi-trailer, a hydraulic motor which may or may not be connected to a de-clutchable speed reducing transfer box normally intended to drive one or more drive axles of the semi-trailer.

An object of the invention is to use completely or partly this system for motorizing the semi-trailer for performing various functions which have normally been performed up to the present time by the engine of the tractor simultaneously or alternately with the use of the motorizing system.

French patent application No. 80 26 650 of Dec. 16, 1980 discloses a closed hydrostatic system for motorizing the semi-trailer, while French patent application No. 81 21 742 of Nov. 20, 1981 relates to a safety hydraulic circuit connected to the piping of the hydrostatic system for motorizing disclosed in the preceding application. The present invention provides special applications capable of being achieved with these devices in particular, but not exclusively, any other motorizing systems provided for a semi-trailer coupled to a tractor for movement along the road and for on site work could possibly be provided.

Further, the element adapted to being driven by the hydraulic apparatus of the invention may be a concrete mixer, for example disposed on the semi-trailer, but the concrete-mixer may be completed by any other element which is mounted on the semi-trailer and which is capable of being driven by the de-clutchable speed reducing gearbox of the motorizing system with which the semi-trailer is provided.

In this case, the element is a supplementary hydraulic circuit adapted for example to control one or more hydraulic rams, an unloading conveyor, or a concrete pump etc.

Concrete-mixers mounted on a semi-trailer or on the supporting vehicle itself are driven in rotation at the present time in two ways:

1. By a direct power take-off from the motor of the tractor connected to a hydrostatic circuit of closed type whereby it is possible to vary the direction and the speed of rotation of the tank of the concrete-mixer. The power required for rotating the latter is therefore taken from the engine of the vehicle. The variable-output hydraulic pump, the main component of the hydrostatic circuit, is provided with a regulating system known per se, permitting the obtainment of a relatively constant output or flow irrespective of the variations in the running speed of the engine of the vehicle in the course of its use on the road, and accelerations produced by the action of the driver on the accelerator. A manual control permits a multiplication of the value of the desired flow and the direction of the fluid for supplying the fluid to the hydraulic motor driving the drum of the concrete-mixer.

2. By an additional or auxiliary engine which is provided in addition to the engine of the vehicle and which replaces the latter for driving the concrete-mixer in its various functions. This auxiliary engine drives a variable-flow pump supplying fluid to the hydraulic motor which rotates the concrete mixer. A manual control permits varying the speed and the direction of rotation of the tank or drum of the concrete-mixer. This additional engine must, as in the preceding case, be of sufficient power to ensure the following functions related to the use of the concrete-mixer:

(a) Stirring or agitation of the concrete in a first direction of rotation at low speed (one to four rpm), the vehicle being in motion or stationery.

(b) Mixing in a first direction of rotation at low or high speed (1 to 8 rpm), the vehicle being stationery.

(c) Emptying in the second direction of rotation of the concrete mixer at high speed (1 to 16 rpm), the vehicle being stationery.

(d) Cleaning in one or the other of the two directions of rotation at high speed (1 to 20 rpm), the vehicle being stationery.

The drawbacks of these two types of devices are the following:

The driving of the concrete-mixer while the vehicle is travelling is effected to the detriment of the power of the engine for use on the road, the rotation of the tank is not really at constant speed owing to the response time of the regulating circuit, and the consumption of fuel on the part of the tractor vehicle is substantially increased.

A direct drive from the engine of the tractor must also be made available, which is rarely provided for by manufacturers and consequently limits the development of this system, the motorizing means being preferably mounted on the two take-off connections of the gearbox, provided the ratio of the speed with the engine is constant. Lastly, in the case of an accidental stoppage of the engine of the tractor, for example on the occasion of an accident on the road, the rotation of the concrete-mixer stops, the concrete sets in the mixer and the concrete-mixer is lost.

The drawback of the second known type of construction, i.e. an auxiliary engine driving a pump supplying fluid to a hydraulic motor coupled to the concrete-mixer, resides essentially in the weight and the high cost of this equipment due to the necessity to have available sufficient power for driving the concrete mixer up to 20 rpm. Consequently, at the present time, power of the order of 100 H.P. for this auxiliary engine is required.

SUMMARY OF THE INVENTION

An object of the invention is therefore to provide apparatus for driving the concrete-mixer to achieve the aforementioned various functions (a, b, c and d) while avoiding the aforementioned drawbacks.

The apparatus according to the invention is adapted to be driven by the gearbox and a de-clutchable power take-off of the engine of the tractor for the purpose of transmitting the mechanical torque of the engine to at least one axle of the semi-trailer. This equipment further comprises, according to French Pat. No. 80 26 650 of Dec. 16, 1980, a closed hydrostatic system for motorizing the semi-trailer, ensuring the mechanical transmission between the power take-off of the tractor and the corresponding axle of the semi-trailer. This hydrostatic system is provided with a hydraulic variable-flow pump and a hydraulic motor supplied with fluid by the pump and connected to a speed-reducing transfer gearbox coupled to a drive axle of the semi-trailer. Such a system permits a reproduction of the movements controlled by the gearbox of the tractor, i.e. a forward travel in one direction of circulation of the fluid, rearward travel by reversing the direction of circulation of the fluid and neutral by a balancing of the fluid circuits, as explained in the aforementioned patent.

Further, the apparatus to which the invention relates comprises, as disclosed in French patent application No. 80 21 742 of Nov. 20, 1981, a safety hydraulic circuit connected to the piping of the hydrostatic system ensuring connection between the pump and the hydraulic motor.

The apparatus is provided with a hydraulic circuit for driving the concrete-mixer in rotation by means of an auxiliary motor associated with a pump.

According to the invention, the apparatus comprises means for controlling the driving of the concrete-mixer in rotation by the hydrostatic motorizing system when the tractor vehicle is stationary, at low or high speeds of rotation and in opposite directions of rotation for performing the "mixing", "emptying" and "cleaning" functions of the concrete-mixer, instead of the auxiliary motor which is of low power and solely reserved for the driving of the concrete-mixer at low speed in a single direction of rotation when the vehicle is moving or stationery.

Therefore the invention takes advantage of the hydrostatic circuit which was used up to the present time solely for motorizing the semi-trailer, as described in French Pat. No. 80 26 650, for the purpose of driving alternately the axle or axles of the semi-trailer or the concrete-mixer, this second utilization being provided for when the vehicle is stationery.

In order to avoid the hydrostatic system for motorizing, the semi-trailer being employed during the "agitation" stage when the vehicle is moving, the invention, as mentioned before, provides for the addition of an auxiliary motor (heat, electric or other motor) of low power, for example of around 20 H.P. with an open or closed hydrostatic circuit for driving the drum of the concrete-mixer.

Thus there is an essential difference with respect to the known device for driving the concrete-mixer by means of an auxiliary motor for all the functions of the concrete-mixer, and such difference is that, in the apparatus according to the invention, the auxiliary motor drives the concrete-mixer solely when the power required is minimum, i.e. at low speed for stirring.

On the other hand, for the other functions of the concrete-mixer which require higher power, the hydrostatic motorizing system is employed and is therefore temporarily employed in a manner different from its initial function when the vehicle is stationery.

Thus the invention permits, among other advantages, the use of the hydrostatic motorizing circuit in an optimum manner, with no compulsion when employed for the road, such as mainly the take-off providing torque from the gearbox of the tractors usually mounted by truck constructors.

Further, the invention permits a reduction in the dead weight and the cost of the equipment required for driving the concrete-mixer, since a low-power auxiliary motor is sufficient for the stirring function.

BRIEF DESCRIPTION OF THE DRAWINGS

Other features and advantages of the invention will be apparent from the following description, with reference to the accompanying drawings, in which one non-limiting embodiment of the invention is shown.

FIG. 1A is a diagram of part of a hydraulic and electric apparatus mounted on a tractor in an embodiment according to the invention.

DETAILED DESCRIPTION OF THE INVENTION

Figure 1B:
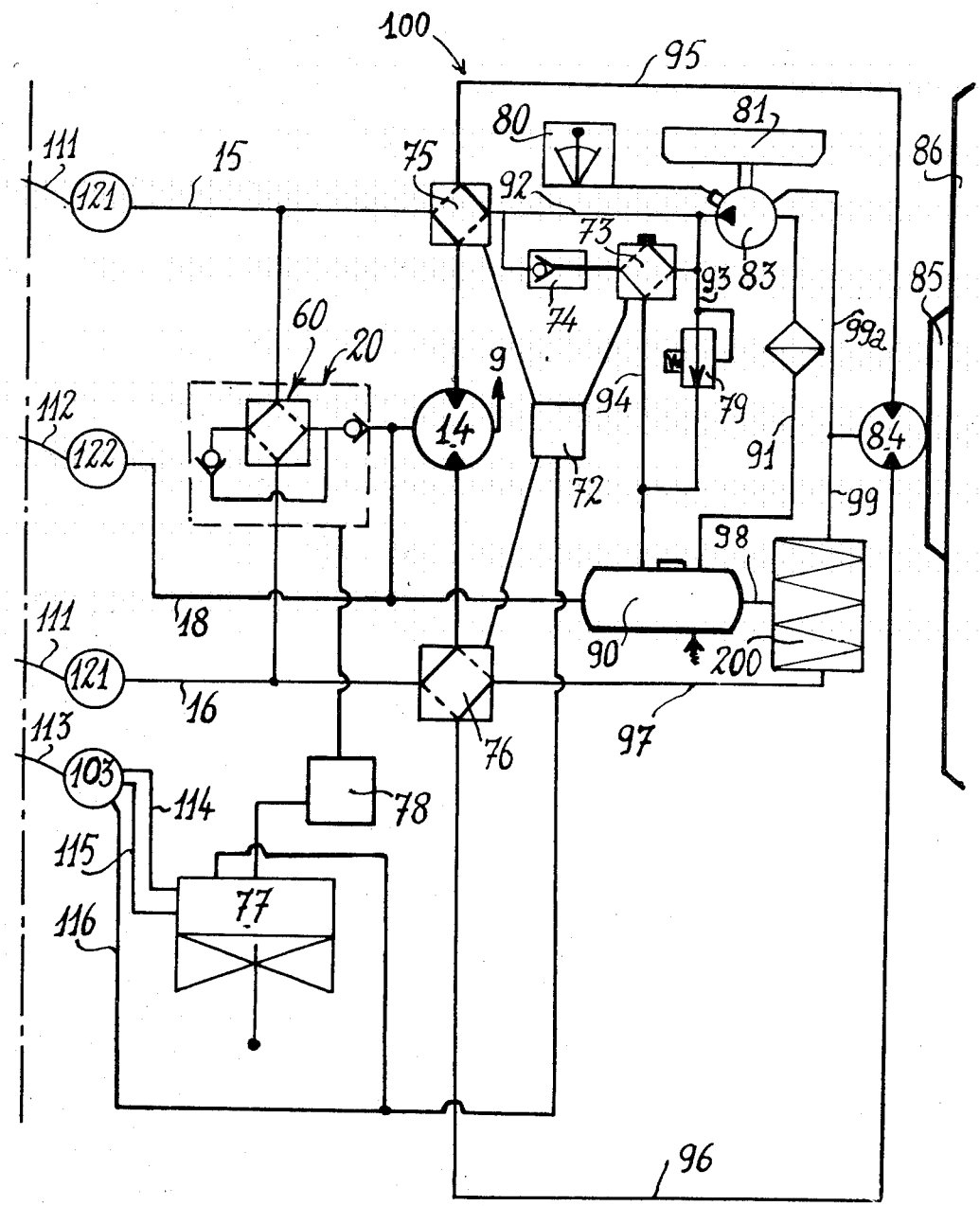
FIG. 1B is a hydraulic and electric diagram complementary to FIG. 1, showing the part of the apparatus mounted on a semi-trailer carrying a concrete-mixer and coupled to the tractor.

The device shown in the drawings is a hydraulic apparatus for driving the axles of a semi-trailer and an element placed on the semi-trailer, such as a concrete-mixer, the semi-trailer being coupled to a tractor for the road and to work on site.

This apparatus, generally represented in FIGS. 1A and 1B, comprises the hydraulic circuits disclosed in French Pat. Nos. 80 26 650 and 81 21 742, the first of these documents disclosing a hydrostatic system for motorizing the axles of a semi-trailer.

The tractor vehicle comprises an engine 1 provided with a gearbox 2 and a de-clutchable power take-off 3. The device for motorizing the axles of the semi-trailer comprises a closed hydrostatic system 6 which provide the mechanical transmission between the take-off 3 and the corresponding axle 9 of the semi-trailer. The hydrostatic system 6 comprises a variable-flow hydraulic pump 13 connected to the take-off 3, a hydraulic motor 14 mounted on the semi-trailer and supplied with fluid by the pump 13 through two pipes 15, 16 and connected to a de-clutchable gearing down transfer gearbox coupled to an axle 9 of the semi-trailer. As described in French Pat. No. 80 26 650, the pump 13 may be locked in either of two distinct capacity conditions corresponding, in one direction, to the forward travel of the vehicle and, in the other direction, to the rearward travel of the vehicle. Further, means disclosed in such French patent are provided for synchronizing the speeds of the tractor and the semi-trailer with respect to at least one forward travel speed and one rearward travel speed.

The hydrostatic circuit 6 may reproduce the movements controlled by the gearbox 2 through its manual gear shift lever 12 (forward speed in one direction of circulation of the fluid, reverse speed by inversion of the direction of circulation and neutral by an equilibrium between the fluid circuits).

The electric circuit controlling the motorization of the semi-trailer comprises a contact switch 30 which is closed by the coupling of the take-off 3 and supplies current to the general circuit controlling the driving of the axle or axles of the semi-trailer. This circuit (not shown) is described in detail in French Pat. No. 80 26 650.

The device is equipped with a hydraulic tank 43 connected by pipes 43a, 43b to the pump 13 and to the motor 14 by a pipe 18 in which are inserted a rapid coupling valve 102 (at low pressure) and a rotary connector 122, these two elements being connected by a pipe 112. The tank 43 norally supplies fluid to the pump 13 and may ensure the safety re-supply of fluid to the motor 14 when the pump 13 is not driven.

Further, a hydraulic safety circuit 20, similar to that described in French patent application No. 81 21 742, is connected to the pipes 15, 16 of the hydrostatic system 6 and ensures the connection between the pump 13 and the motor 14. The circuit 20 differs from that disclosed in such French patent solely by the fact that it includes a four-way inverter 60 instead of a three-way inverter, so that a check-valve can be eliminated. Indeed, the circuit 20 modified in this way has only two check-valves, as shown in FIG. 1B.

The inverter 60 may be controlled by the gearbox 2 and it is adapted to permit the motor 14 mounted on the semi-trailer to rotate and to be supplied with fluid when the pump 13 does not rotate or does not yet have the required capacity to ensure that the wheels of the semi-trailer rotate at the same speed as those of the motor. The safety circuit 20 also permits palliating the possible counter-pressure in the downstream pipe (15 or 16 depending on the direction of circulation of the fluid) of the motor 14.

Disposed on the semi-trailer is a concrete-mixer 86 provided with a reducer 85 receiving a hydraulic motor 84 which is preferably identical to the motor 14.

According to the invention, the apparatus comprises means for controlling the driving of the concrete-mixer 86 in rotation through the hydrostatic motorizing system 6 when the tractor vehicle is stationary, at a low or high speed of rotation and in both possible directions of rotation so as to perform the "mixing", "emptying" and "cleaning" functions of the concrete-mixer. In order to ensure the "agitation" function during which the tank of the concrete mixer 86 rotates slowly and does not reach a quarter of the maximum speed of rotation, the invention provides for the mounting on the semi-trailer of a low power (for example about 20 H.P.) auxiliary motor 81 which drives a hydraulic pump 83. The latter is preferably a variable output pump and is in an open circuit. The "agitation" function only requires a single direction of rotation of the concrete-mixer 86 and a closed circuit is not justified in view of its cost. However, a variable output permits a flexible adjustment of the speed of rotation of the concrete-mixer 86 by employing the motor 81 at a speed thereof providing optimum efficiency. The auxiliary motor 81 may be of any suitable known type and the pump 83 is connected to the motor 84 through a hydraulic circuit (92, 95, 96, 97, 91) of the open type also known per se, although this type of circuit is not conventionally employed for driving a concrete-mixer. The pump 83 is adjusted by a remote control element 80 whereby it is possible for the driver to adjust manually the capacity of the pump 83. The choice of the speed of rotation of the concrete-mixer 86 is effected by locking the capacity of the pump 83 to a value chosen by the driver, it being possible to arrange a pre-setting of the remote control 80 at a plurality of interesting positions so as to simplify the utilization thereof.

The hydraulic circuit supplied with fluid by the pump 83, generally designated by the reference numeral 100, further comprises a pressure limiter 79 inserted in a pipe 93 connecting the pump 83 to a buffer tank 90 with which communicate the pipes 18 and 91. Further, the circuit 100 is provided with a heat exchanger 200 having a cooling function and connected to the tank 90 through a pipe 98, and to the motor 84 through a pipe 99 and with which the pipe 97 communicates. The pipe 99 is also connected to the pump 83 through a pipe 99a.

Inserted in the pipe 15 are a rapid coupling valve (high pressure) 101 and a rotary connector 121 which are connected by a pipe 111 and the same arrangement is provided for the pipe 16.

The means controlling the rotation of the concrete-mixer 86 through the motorizing system 6 comprise an electric circuit controlled manually by the driver and provided with a switch 70 which has two positions, namely a "MOT" position and an "AUX" position, and is connected to the switch 30. The first position, or "MOT" position (see FIG. 1A), ensures the motorization of the semi-trailer through the hydrostatic system 6, while the second position, or "AUX" position, ensures the transmission of the electric control to a relay 72 capable of actuating valves 75, 76 pertaining to the connection between the hydrostatic system 6 and the hydraulic circuit 100 of the auxiliary motor 81. The valves 75 and 76 are, in the embodiment illustrated in FIG. 1B, of the four-way type. The relay 72 is also capable of actuating a third valve 73 which is connected, through a pipe 94, to the buffer tank 90 and to the pipe 93 and to the pipe 92 through a pipe in which a check-valve 74 is inserted.

Figure 2:
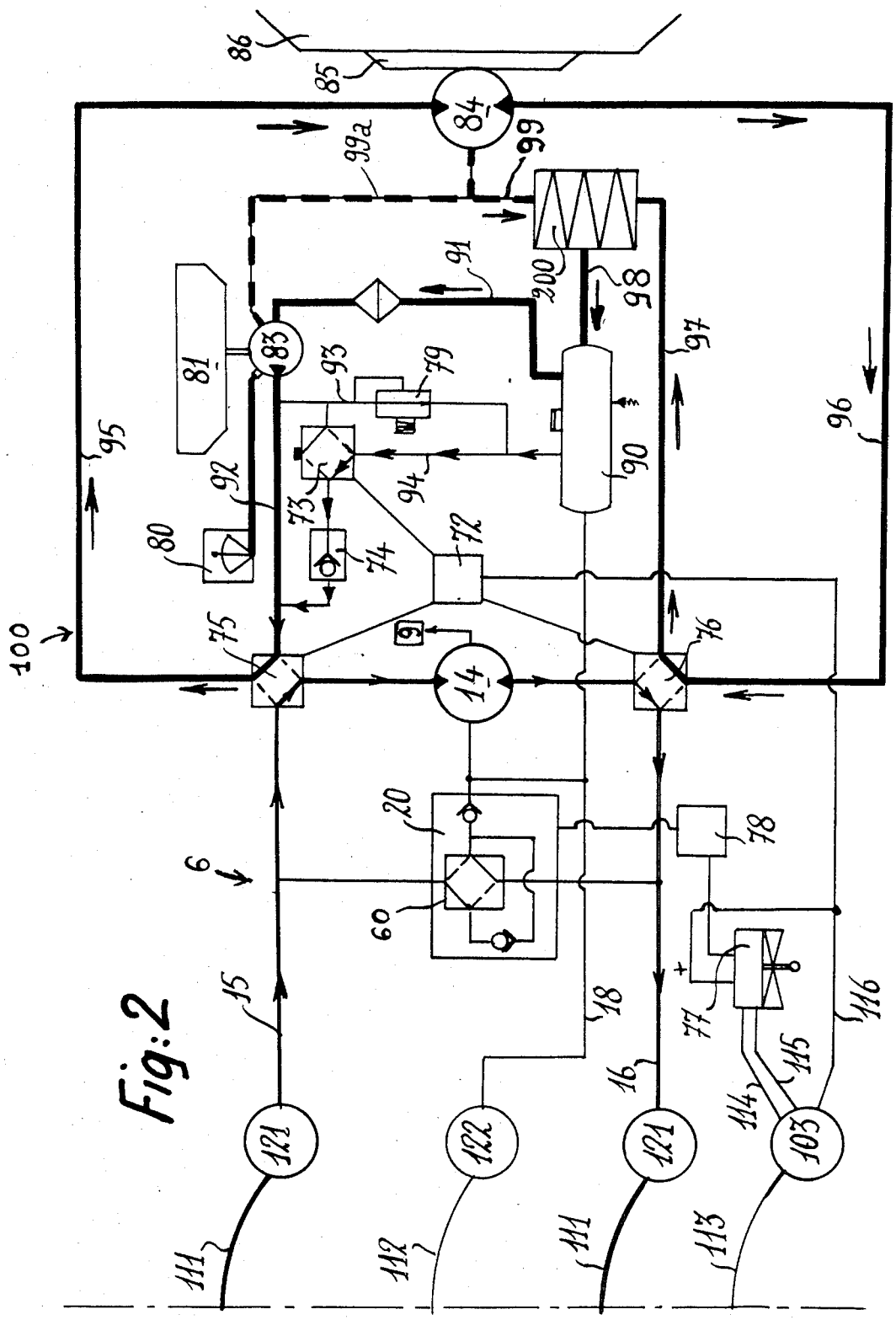
FIG. 2 is a diagram identical to FIG. 1B but showing the operation of the hydraulic circuits and the direction of circulation of the fluid in the latter when the driving of the concrete mixer is ensured by an auxiliary motor and the hydrostatic circuit is used for motorizing the semi-trailer.
Figure 3:
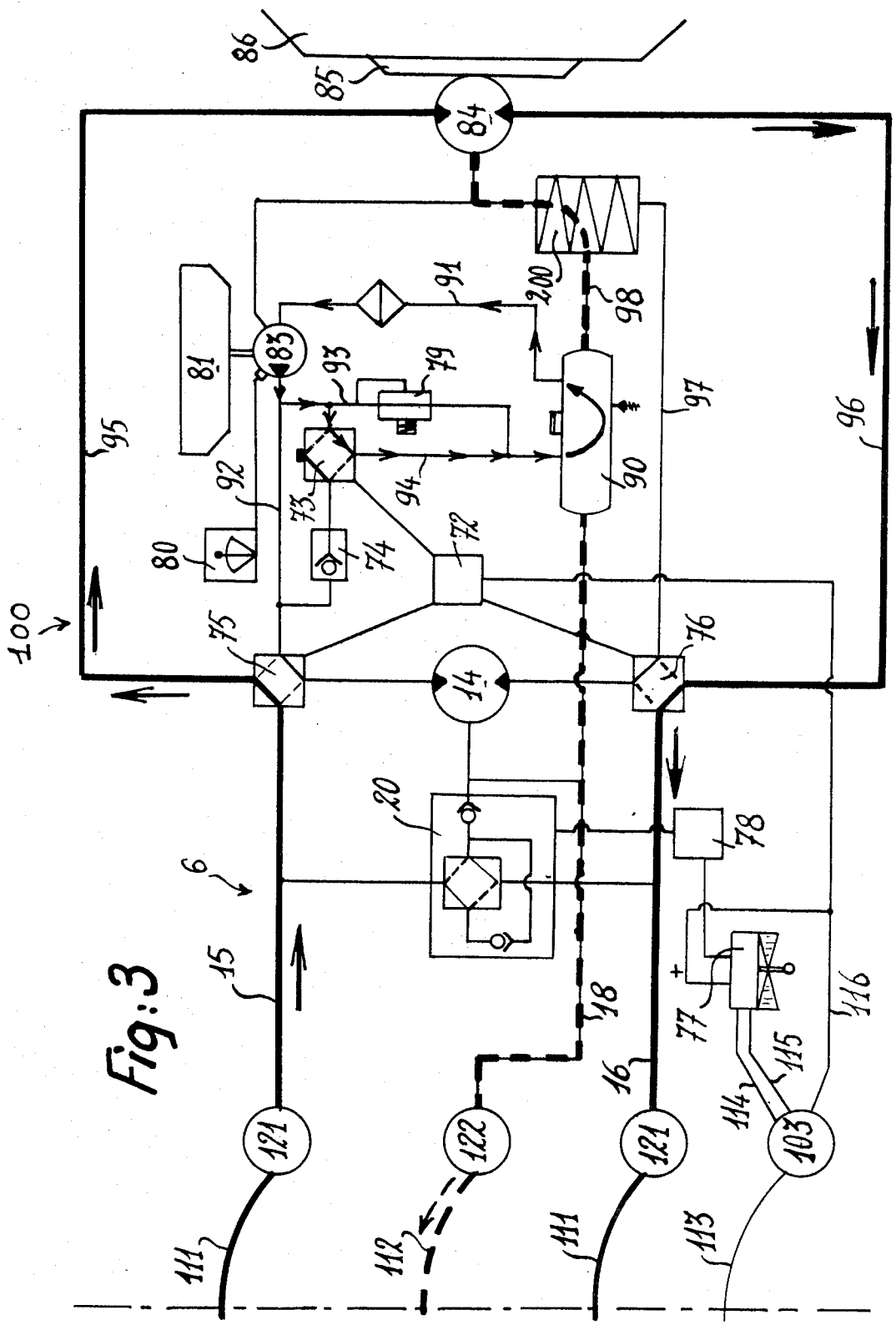
FIG. 3 is a diagram identical to that of FIG. 1B showing the operation of the apparatus and the direction of circulation of the fluid when the driving of the concrete-mixer is ensured by the hydrostatic system for motorizing the semi-trailer, in the first direction of rotation corresponding to forward travel.

In a first position of rest, corresponding to the driving of the concrete-mixer 86 by the motor 81 and to the motorization of the semi-trailer, the valve 73 permits the supplying of fluid from the tank 90 to the motor 84 (see FIG. 2). In its second operative position, brought about by the relay 72, the valve 73 returns to the tank 90 the hydraulic fluid from the pump 83 and thus renders the motor 81 inoperative, while the circuit 95, 96 connected to the motor 84 communicates with the hydrostatic system 6, owing to the action of the valves 75 and 76 which are controlled by the relay 72 and establish the communication between the pipes 95, 96 and the pipes 15 and 16 respectively, as shown in FIG. 3.

The switch 70 is connected through plug and socket means 103, which are connected by connection 113, to a control element such as an inverting rheostat 77 (FIG. 1B) connected to the relay 72 and to the means 103 by connections 114 and 115. One of these connections, for example the connection 114 is employed for the first direction of rotation of the concrete-mixer 86 corresponding to a first direction of circulation of the fluid in the motor 84 (for example forward speed as indicated by the arrows in FIG. 3). The other connection (for example the connection 115) is employed for the second direction of rotation of the concrete-mixer 86 corresponding to the opposite direction of circulation of the fluid (reverse operation) illustrated by the arrows shown in FIG. 4. This setting is carried out manually by the driver.

The switch 70 is connected to the plug and socket means 103 and to the rheostat 77 through a connection 116 with preferably insertion of a safety circuit-breaker 71 (FIG. 1A). This circuit-breaker is connected to the change gear level 12 so that the electrical information coming from the switch 70, which is put into the "AUX" position, is only transmitted to the rheostat 77 if the lever 12 is in the neutral position, the vehicle being stationery.

According to a particular feature of the invention, a relay 78 is inserted between the rheostat 77 and the safety circuit. This relay 78 is capable of transmitting to the inverter 60 an order from the rheostat 77 to place this inverter in the position thereof for the return of the fluid of the pipe 15 on the downstream side of the motor 84 to the upstream pipe 16 in the event of a counter-pressure in the downstream pipe 15. This arrangement enables the hydraulic fluid to circulate in the hydrostatic system 6 and in the circuit 100 of the auxiliary motor 81 corresponding to reverse operation illustrated by the arrows in FIG. 4.

The wires 114, 115 connect the plug and socket means 103 to an electrical directional valve E mounted on the pump 13. The latter is known per se, it is hydraulic and of the closed circuit type and provided with a forced-feed pump and a re-supply circuit in the case of overload. The electrical directional valve E pilots the inclination of the O plate to the maximum capacity in both directions, which permits two directions of circulation of the fluid. The description of French patent application No. 80 26 650 shows that the two solenoids of the electrical directional valve E are supplied with maximum current necessary to achieve immediately the piloting of the pump at the preset maximum capacity. In the presently-described system, the proportional electric supply is transmitted through an annex circuit, represented by the elements 77, 103, 113, 114 or 115, so as to obtain a variation in the output of the pump 13 in accordance with the programmed intensity.

The apparatus just described operates in the following manner:

1. Operation in the "agitation" stage of the concrete-mixer 86 by a slow rotation in the first direction of rotation when the tractor and semi-trailer are moving.

In this mode of operation, illustrated in FIG. 2, the concrete-mixer 86 is driven at low speed by the auxiliary motor 81 and it circuit 100, which supplies fluid to the motor 84, the fluid traveling through this circuit in the manner shown by the arrows marked on the pipes 92, 95, 96, 97, 98, 91.

Fluid leaking from the motor 84 and the pump 83 flows through the connections 99 and 99a to a tank 90 by way of the cooler 200 and the junction 98. In the case of a driving load (for example inertia of the tank of the concrete-mixer under load upon the return of the pump 83 to 0), the motor 84 is supplied with fluid by the circulation of the fluid from 90 to 84 through the connections 94, 92 and 95. The check-valve 74 ensures the passage of fluid solely in the direction from 90 to 92 by way of the valve 73 in its non-excited position.

The circuit 100 is isolated from the hydrostatic circuit 6 by the valves 75 and 76 and the hydrostatic circuit 6 drives the axle or axles 9 of the semi-trailer, the vehicle travelling around the ground.

During this stage of the driving of the concrete-mixer 86 by the motor 81, the switch 70 is in the "MOT" position so that the relay 72 is not excited by the rheostat 77 and the valves 75, 76 are at rest and isolate the circuit 100 from the hydrostatic circuit 6.

2. Operation in the first direction of rotation (forward travel) for ensuring the "mixing" or "cleaning" functions of the concrete mixer 86 when the tractor and semi-trailer are stationary.

This manner of operation is illustrated by the arrows in FIG. 3 indicating the direction of circulation of the fluid.

The driver places the switch 70 in the "auxiliary" position and the rheostat 77 consequently excites the relay 72 which shifts the valves 75, 76 to their opposite positions in which they establish communication between the circuit 6 and the circuit 100. More precisely, the pipe 15 is put in communication with the pipe 95 and the pipe 16 communicates with the pipe 96. Further, the relay 72 actuates the valve 73 which assumes the operative position and returns the output of the pump 83 to the tank 90 (arrows in FIG. 3). Fluid leaking from the motor 84 flows to the tank 90 through the pipes 99, 98 and the exchanger 200.

The fluidtight tank 90 avoids a possible cavitation of the pump 83 by the pressure drops which may result from the small sections of the return circuits. Preferably, the tank 43 is put under a very low pressure so as to improve the conditions of the supply of fluid to the pumps 13 and 83. By construction, the fluidtight tank 90 is connected to the main tank 43 and the return of fluid leaking from the circuits 100 and 6 is common thereto.

The exchanger 200 ensures, in addition to the tank 90, a normal temperature of the hydraulic circuit 100 by the obligatory return of the leakage fluid from the motor 84 and the pump 83. In the "AUX" position of the pump 13, the latter may be adjusted to a capacity varying from 0 to the maximum by action on the rheostat 77. In the "MOT" position, the pump 13 is adjusted either to the O capacity or to the maximum capacity.

In its position of rest (FIG. 2), the valve 73 permits the supply of fluid to the motor 84 in a single direction of rotation through the connections 92 and 95, the return of the leakage fluid at 99 and the circuit 96, 97 being in direct access to the tank 90 by passage through the cooler 200 and the circuit 98.

In the excited position, brought about by the placing of the switch 70 in the "AUX" position, the valve 73 enables, as explained before, the pump 83 to discharge into the tank 90, irrespective of the capacity setting of the pump, through the circuits 93 and 94.

Additionally, a supplementary hydraulic circuit may be provided, for example for controlling a conveyor belt or a concrete pump.

The pump 13 supplies fluid to the motor 84 through the circuits 15, 95 or 16, 96 in accordance with the direction of circulation of the fluid. The motor 14 is rendered free and lubricated by its direct connections to the return circuit leading to the tanks 90 and 43.

3. Operation in the second direction of rotation of the concrete-mixer 86 corresponding to the reverse operation when the tractor and semi-trailer are stationary.

Figure 4:
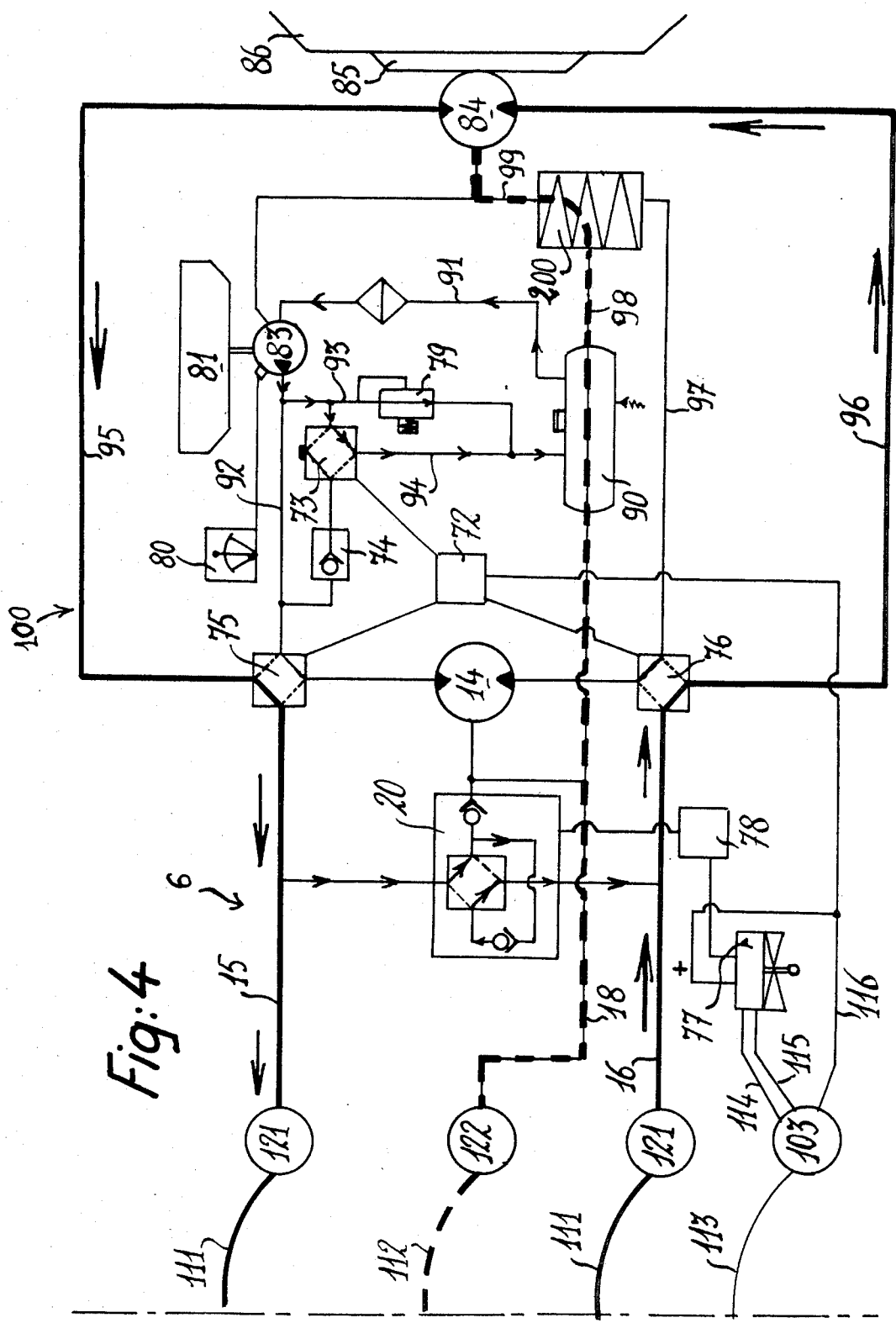
FIG. 4 is a diagram identical to FIG. 1B, showing the operation of the apparatus and the direction of the circulation of the fluid in the hydrostatic circuit for motorizing and the circuit of the auxiliary motor when the concrete-mixer is driven by the hydrostatic system in a second direction of rotation corresponding to rearward travel.

This mode of operation, which permits either the high speed emptying or the high speed cleaning of the concrete-mixer with the vehicle stationary, is indicated by the arrows shown in FIG. 4.

In order to achieve the reverse operation, owing to the fact that the gear lever 12 is by definition in the neutral position, an order must be sent out by the rheostat 77 to the directional valve inverter 60 of the safety circuit 20 so as to place the latter in its "excited" position corresponding to the "reverse operation" in the "motorization" function of the hydrostatic circuit 6.

For this purpose, the driver actuates by means of the rheostat 77, in a known manner (not shown), the relay 78 which shifts the inverter 60 to its position shown in FIG. 4. In the latter, the inverter 60 allows, in the event of a counter-pressure in the low pressure pipe 15 (the fluid circulating in the pipes 16, 96 to the pipes 15, 95 through the motor 84), the fluid to pass from the pipe 15 to the pipe 16 (arrows). Further, the valves 75, 76 are in the same position as in FIG. 3 and put the hydraulic circuits 6 and 100 in communication. In the same way, the valve 73 continues to return the fluid delivered by the pump 83 to the tank 90.

It will be observed that the safety circuit 20, when it is in the position of rest (non-excited), corresponds to the forward operation. Corresponding to the latter are the first direction of rotation of the concrete-mixer 86 and the first direction of circulation of the fluid which permits avoiding the stopping of the drum of the concrete-mixer in a fixed position in the case of the returning to zero of the capacity of the pump 13.

When the direction of rotation of the concrete-mixer 86 is reversed (FIG. 4), the circuit 20 must be excited.

The invention has the following advantages in addition to the previously-mentioned advantages:

It increases the reliability of the apparatus and reduces maintenance costs, with a more rational utilization of the available powers.

In view of the low power required for the "agitation" stage of the operation of the concrete-mixer 86, the auxiliary motor 81 may be a heat engine, or an electric motor or a pneumatic motor, etc.

The auxiliary motor 81 constitutes a complementary driving system for the concrete-mixer 86 whereby it is possible to remedy an accidental stoppage of the engine of the tractor or vice-versa.

The concrete-mixer may be replaced by another element such as concrete pump, boring device, winch, or any other system which may be driven by a hydraulic motor. A supplementary hydraulic apparatus may be controlled in an independent manner by the connection to a take-off of the torque developed by the hydraulic motor for the motorization on the de-clutchable gearing down gearbox of the motorization circuit 6.

Figure 5:
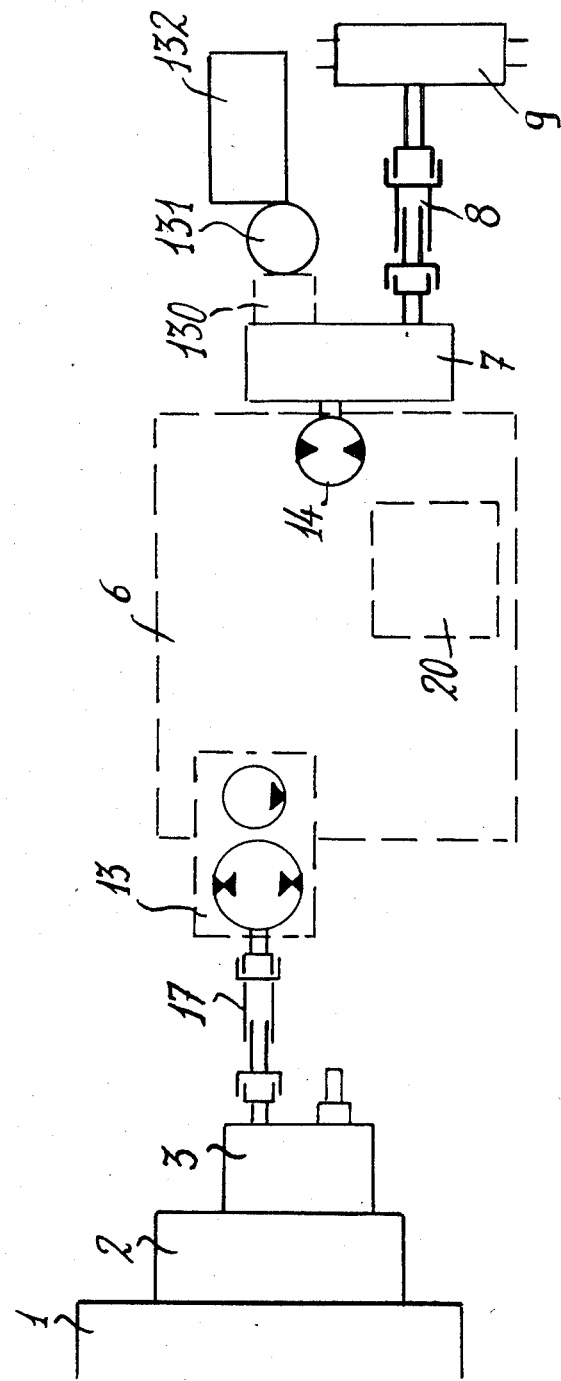
FIGS. 5 and 6 are hydraulic diagrams illustrating the application of the apparatus in the driving of an element other than a concrete-mixer and comprising a supplementary hydraulic circuit.
Figure 6:
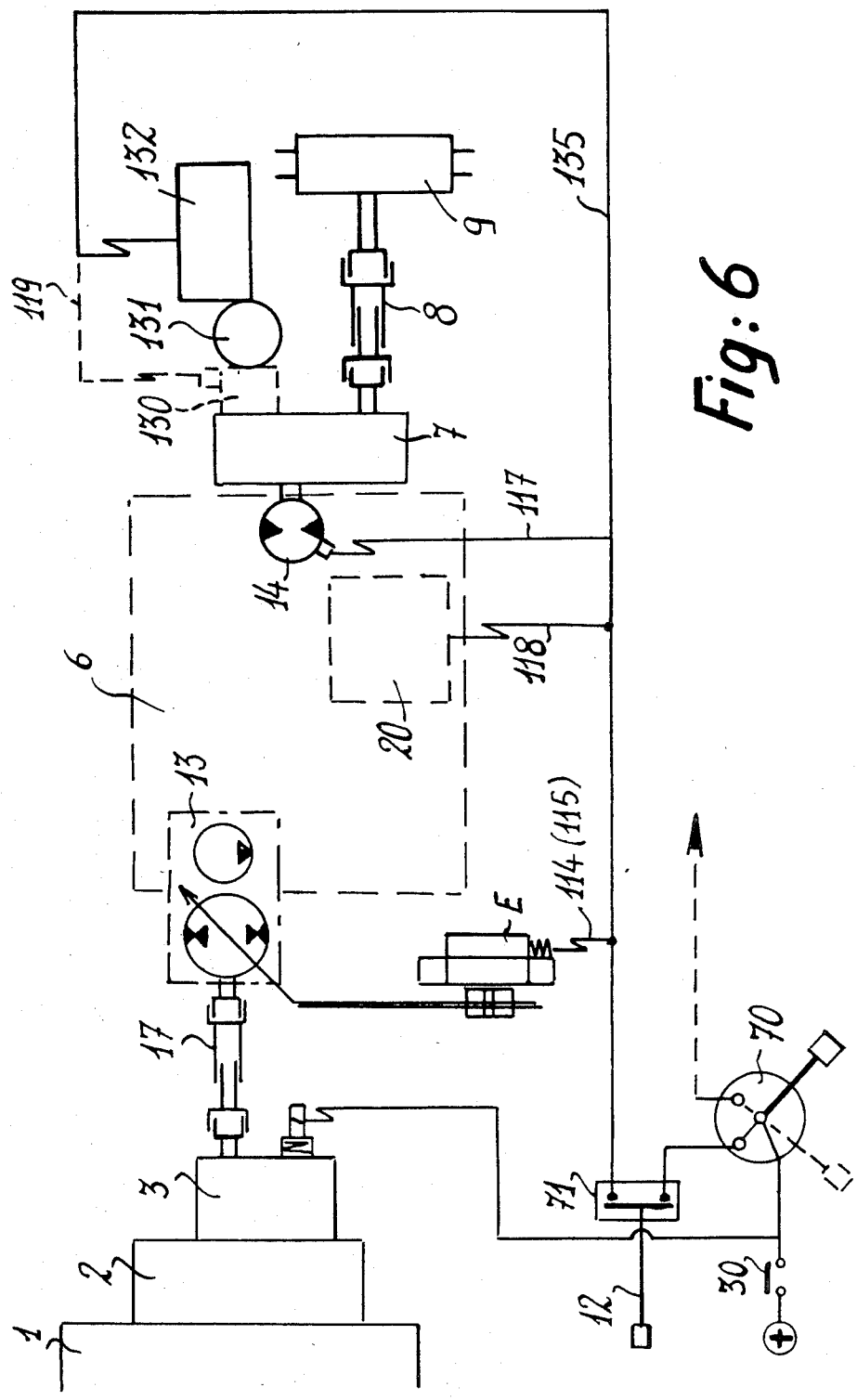

Such an embodiment of the apparatus according to the invention is illustrated in FIG. 5 and 6 which show how it is possible to realize an auxiliary driving system controlling a supplementary hydraulic circuit 132 by means of a take-off on the gearing down gearbox 7 providing the torque to be developed by the hydraulic motor 14 of the motorizing system 6.

This supplementary hydraulic circuit 132 is independent of the motorization circuit 6 and may be controlled in two ways:

Vehicle in motion: Motorizing system 6 in operation.

Vehicle stationary: Gearbox of the tractor in the neutral position.

The possible functions of this supplementary circuit 132 are known per se and will not be described in detail. Such a circuit may be employed for example for controlling either a complementary equipment (unloading conveyor belt, concrete pump, stabilizing rams etc.) if the motorized semi-trailer is provided with a concrete-mixer as described hereinbefore, or any other function (grab, crane, elevating platform etc.) if the motorized semi-trailer is provided with another body.

In this embodiment of the apparatus according to the invention, the motorizing system 6 is employed for performing the aforementioned functions, instead of an engine conventionally employed, which is usually that of the tractor.

This manner of proceeding has the advantage of freeing the tractor from a usually space-consuming device which imparts thereto an increased polyvalence as concerns traction and the specific functions of the semi-trailer may be grouped on the latter. Further, the dead weight and the cost of the apparatus are considerably reduced.

The hydraulic motor 14 mounted on the box 7 drives the drive axle 9 of the semi-trailer when the motorizing device 6 is in operation and the gearing down gearbox 7 is engaged and drives the transmission 8. The gearbox 7 is adapted to receive on one of its gear wheels a hydraulic pump 131. The speed of rotation of the latter is proportional to that of the motor 14 and consequently to that of the engine 1 of the tractor.

In the case where the pump 131 is arranged for a single direction of rotation, a de-clutchable power take-off 130 is interposed between the gearing of the gearbox 7 and the pump 131. This permits isolating one of the directions of rotation of the hydraulic motor 14. The operation of the circuit 132 depends on the information derived from the coupling of the take-off 130. This information may be controlled by one of the components of the motorizing system (for example the solenoid of the electrical direction valve E of the pump 13, contactor of the gearbox 2 etc., it being understood that these examples are not intended to be limitative), so as to select in complete safety the direction of rotation of the motor 14 employed for driving the pump 131.

There will first of all be described the manner in which the hydraulic circuit 132 is controlled when the vehicle is traveling along the ground and the motorizing system 6 is in operation (FIG. 5).

The motor 14 drives, by the gearing of the gearbox 7, the transmission 8 to the drive axle 9 of the semi-trailer and the pump 131. The hydraulic circuit 132 is of known type, depending on the pump 131 and the desired controls: rams, hydraulic or pneumatic motor etc. The different possible versions will not be described in detail since they are known and in wide use. When the motorizing circuit 6 drives the pump 131 and the circuit 132 is in the neutral position, the required power for driving the circuit 132 is negligible. Either (a) the pump 131 discharges to the tank of the circuit 132 if it concerns a pump having a fixed capacity with one or two directions of rotation, or (b) the pump 131 has zero capacity if it concerns a variable output pump in an open or closed circuit.

The use of the hydraulic circuit 132 independent from the motorizing circuit 6 may be ensured by any known means. The operation of the circuit 132 depends on the power available at the output of the gearbox 7 and 4,542,99 required by the motor 14 in addition
required for driving the
There will